(12) United States Patent
Sasaoka et al.

(10) Patent No.: US 9,822,263 B2
(45) Date of Patent: Nov. 21, 2017

(54) ELECTRODEPOSITION COATING MATERIAL COMPOSITION AND CATALYST FOR ELECTRODEPOSITION COATING MATERIAL

(71) Applicant: Nitto Kasei Co., Ltd., Osaka-shi, Osaka (JP)

(72) Inventors: Shinichi Sasaoka, Osaka (JP); Takahiro Wazaki, Osaka (JP); Yuya Nakagawa, Osaka (JP); Hideo Haneda, Osaka (JP); Makoto Nakada, Osaka (JP)

(73) Assignee: Nitto Kasei Co., Ltd., Osaka-shi (JP)

( * ) Notice: Subject to any disclaimer, the term of this patent is extended or adjusted under 35 U.S.C. 154(b) by 0 days.

(21) Appl. No.: 15/306,463

(22) PCT Filed: Mar. 20, 2015

(86) PCT No.: PCT/JP2015/058532
§ 371 (c)(1),
(2) Date: Oct. 24, 2016

(87) PCT Pub. No.: WO2015/166745
PCT Pub. Date: Nov. 5, 2015

(65) Prior Publication Data
US 2017/0051160 A1 Feb. 23, 2017

(30) Foreign Application Priority Data

Apr. 28, 2014 (JP) ................................. 2014-092739

(51) Int. Cl.
| C09D 5/44 | (2006.01) |
| C09D 5/08 | (2006.01) |
| B01J 23/18 | (2006.01) |
| B01J 31/22 | (2006.01) |
| C09D 7/12 | (2006.01) |
| C09D 201/00 | (2006.01) |

(52) U.S. Cl.
CPC ............ C09D 5/4496 (2013.01); B01J 23/18 (2013.01); B01J 31/2213 (2013.01); C09D 5/08 (2013.01); C09D 5/44 (2013.01); C09D 5/4465 (2013.01); C09D 7/12 (2013.01); C09D 201/00 (2013.01); B01J 2231/005 (2013.01); B01J 2531/54 (2013.01)

(58) Field of Classification Search
CPC .......... C09D 5/4496; C09D 5/08; C09D 5/44; C09D 5/4465; B01J 2231/005; B01J 2531/54; B01J 23/18; B01J 31/2213
USPC ........................ 106/1.26; 204/489; 502/170
See application file for complete search history.

(56) References Cited

U.S. PATENT DOCUMENTS

| 4,321,304 | A | * | 3/1982 | Castellucci | .......... | C09D 163/00 204/486 |
| 4,385,097 | A | * | 5/1983 | Isozaki | .................. | C09D 5/08 252/389.1 |
| 6,811,667 | B2 | * | 11/2004 | Hermann | ............. | C09D 5/4492 204/489 |
| 8,933,138 | B2 | * | 1/2015 | Hintermann | .......... | B01J 31/223 502/171 |
| 2001/0053828 | A1 | * | 12/2001 | Nishiguchi | .......... | C09D 5/4496 525/528 |
| 2002/0010273 | A1 | * | 1/2002 | Matsumura | .......... | C09D 143/04 525/100 |
| 2004/0166364 | A1 | * | 8/2004 | Kathirgamanathan | . | C09K 11/06 428/690 |
| 2005/0131193 | A1 | * | 6/2005 | Garner | ................ | C09D 5/4453 528/45 |
| 2006/0211831 | A1 | | 9/2006 | Nishiguchi et al. | | |
| 2007/0060732 | A1 | | 3/2007 | Yang et al. | | |
| 2010/0234485 | A1 | | 9/2010 | Steck et al. | | |
| 2011/0042222 | A1 | | 2/2011 | Peters et al. | | |

(Continued)

FOREIGN PATENT DOCUMENTS

| JP | 2-265974 A | 10/1990 |
| JP | 7-331130 A | 12/1995 |

(Continued)

OTHER PUBLICATIONS

International Search Report dated Jun. 9, 2015, issued in corresponding International Application No. PCT/JP2015/058532, filed Mar. 20, 2015, 4 pages.

*Primary Examiner* — Helene Klemanski
(74) *Attorney, Agent, or Firm* — Christensen O'Connor Johnson Kindness PLLC

(57) ABSTRACT

Provided is an organic tin-free cationic electrodeposition coating composition which does not contain organic tin compound and can sustain a superior coating curability under currently used baking conditions, and to a catalyst for the composition. A catalyst for electrodeposition coating composition containing a bismuth compound (A), wherein: the bismuth compound is a compound having a ligand prepared from a β-diketone represented by Chemical Formula (1) is provided.

Chemical Formula (1):

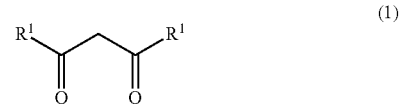

(1)

(wherein, a plurality of $R^1$ are the same or different from each other and represent a hydrocarbon group, and a number of total carbon atoms in two $R^1$ is 4 or larger)

6 Claims, No Drawings

(56) References Cited

U.S. PATENT DOCUMENTS

| | | | | |
|---|---|---|---|---|
| 2011/0214992 A1* | 9/2011 | Kaylo | ............ | C09D 5/44 |
| | | | | 205/50 |
| 2015/0008125 A1* | 1/2015 | Sasaoka | ............ | C09D 5/44 |
| | | | | 204/489 |
| 2016/0298250 A1* | 10/2016 | Markou | ............ | C09D 5/44 |

FOREIGN PATENT DOCUMENTS

| | | | |
|---|---|---|---|
| JP | 11-152432 | A | 6/1999 |
| JP | 2000-336287 | A | 12/2000 |
| JP | 2002-129100 | A | 5/2002 |
| JP | 2006-057025 | A | 3/2006 |
| JP | 2006-257268 | A | 6/2006 |
| JP | 2007-084727 | A | 4/2007 |
| JP | 2009-084727 | A | 3/2009 |
| JP | 2009-508985 | A | 3/2009 |
| JP | 2011-501774 | A | 1/2011 |
| JP | 2011-513525 | A | 4/2011 |

* cited by examiner

ELECTRODEPOSITION COATING MATERIAL COMPOSITION AND CATALYST FOR ELECTRODEPOSITION COATING MATERIAL

TECHNICAL FIELD

The present invention relates to an organic tin-free electrodeposition coating composition which does not contain organic tin compound and can sustain a superior coating curability under currently used baking conditions, and to a catalyst contained in the composition and promotes a cross-linking reaction.

BACKGROUND ART

In general, a coating is applied onto the surface of a metal material for protecting the material from corrosion and to maintain its beautiful appearance during its use. Here, in cases where parts such as automobiles and electrical equipments having a pocket portion are coated, electrodeposition is widely applied in primer coating since it has superior deposition property and is low in environmental pollution when compared with air spray coating and electrostatic spray coating. In particular, a cationic electrodeposition coating is widely used as a coating method for primer coating with respect to objects to be coated that are large and require high corrosion resistance such as a body of automobiles. This is since the cationic electrodeposition coating enables sequential coating.

In general, cationic electrodeposition coating is conducted by dispersing a binder component containing a cationic resin and a curing agent in an aqueous medium containing a neutralizer such as an organic acid to give a cationic electrodeposition coating composition, followed by allowing an object to be coated be immersed in the composition as an anode, and then applying voltage.

When the voltage is applied between the electrodes during the coating process, an electrodeposition coating precipitates at the surface of the anode (object to be coated) as a result of an electro-chemical reaction. The electrodeposition coating thus formed contains the curing agent as well as the cationic resin. Accordingly, when the electrodeposition coating is baked after the electrodeposition process, the coating cures and forms a desired cured coating.

As the cationic resin used for the cationic electrodeposition coating composition, amine-modified epoxy resins have been used in the light of corrosion resistance. As the curing agent used for the cationic electrodeposition coating composition, blocked polyisocyanate and the like, a polyisocyanate blocked with alcohol and the like for example, have been used.

In addition, in order to improve the curability, which serves as an indication of various performances of the coating, catalyst that accelerate the cross-linking reaction of the curing agent has been added. Typical catalyst used is an organic tin compound.

However, the organic tin compound may be a cause of catalyst poisoning for the deodorizing catalyst in the baking furnace of the coating line. In addition, from the current environmental regulation trend, there is a possibility that the use of organic tin compounds may be banned. Therefore, development of a cationic electrodeposition coating composition which uses a catalyst alternative to the organic tin compound has been strongly desired.

As the alternative catalyst to the organic tin compound, a cationic electrodeposition coating composition using a zinc borate, a quaternary ammonium salt of organic acid, a zinc compound or the like has been suggested (Patent Documents 1 to 3). However, the effect of these compounds as a catalyst were insufficient, and the curability and the anticorrosion property were not practically satisfactory.

In addition, a cationic electrodeposition coating composition containing a metal chelate compound; a tetravalent organic titanium, zirconium, or hafnium complex having an oxygen-containing ligand; and fluorometalates of zirconium or titanium; have been suggested (Patent Documents 4 to 6). However, curability of the coating was not sufficient when these compounds were used alone, and thus the organic tin compound need be used in combination.

Further, a bismuth acetylacetone complex has been suggested (Patent Document 7), however, since the shelf stability in the paste dispersion is low, the curing property of the catalyst decreases drastically after a certain period of storage, or the viscosity of the composition increases to form a gel, which are regarded problematic.

Accordingly, there has not been known a cationic electrodeposition coating composition which does not contain organic tin compound and can sustain a superior coating curability under currently used baking conditions.

PRIOR ART REFERENCE

Patent Document

Patent Document 1: JP-A-7-331130
Patent Document 2: JP-A-11-152432
Patent Document 3: JP-A-2000-336287
Patent Document 4: JP-A-2-265974
Patent Document 5: JP-A-2011-513525
Patent Document 6: JP-A-2006-257268
Patent Document 7: JP-A-2002-129100

SUMMARY OF THE INVENTION

Problems to be Solved by the Inventions

The present invention has been made in view of such circumstances, and the object of the present invention is to provide a cationic electrodeposition coating composition which does not contain organic tin compound and can sustain a superior coating curability under currently used baking conditions, and a catalyst for the composition.

Means for Solving the Problems

According to the present invention, a catalyst for an electrodeposition coating composition containing a bismuth compound (A), wherein the bismuth compound is a compound having a ligand prepared from β-diketone represented by Chemical Formula (1), is provided.

Chemical Formula (1):

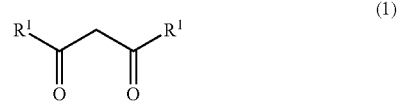
(1)

(wherein, a plurality of $R^1$ are the same or different from each other, and represent a hydrocarbon group, and a number of total carbon atoms in two $R^1$ is 4 or larger)

The present inventors have conducted an evaluation on the catalyst performance with various substances, in order to solve the afore-mentioned problems. Accordingly, the inventors have found that the afore-mentioned bismuth compound (A) has an exceptionally superior characteristic, and thus have achieved the present invention.

The present inventors have prepared bismuth compounds (A) from various β-diketones of Chemical Formula (1) wherein the number of total carbon atoms in two $R^1$ is 4 or larger, and studied the catalytic activity thereof, thereby achieving superior results. The inventors have further made a study to evaluate the stability of the bismuth compounds (A) in a water-based medium by storing the catalyst paste at 35° C. for 30 days and performing electrodeposition again. The catalytic activity observed as shown in Table 3 revealed that superior results can be achieved.

The bismuth acetylacetone complex of conventional technique is a compound prepared from β-diketone represented by Chemical Formula (1), wherein the number of total carbon atoms in two $R^1$ is 2. As shown in Comparative Examples 1 to 4, possibly due to the poor stability in the water-based medium, when the catalytic activity was studied by performing electrodeposition using a catalyst paste stored at 35° C. for 30 days, the results were unsatisfactory.

Then, in order to investigate whether the afore-mentioned catalytic activity is characteristic to the bismuth compound (A) of the present invention, bismuth oxide, bismuth hydroxide, and bismuth acetate oxide were also used to prepare a catalyst paste stored at 35° C. for 30 days, and the electrodeposition was performed. Accordingly, as shown in Comparative Examples 5 to 7, the catalytic activity did not show good results.

From the afore-mentioned results, it became apparent that superior catalytic activity, stability in water-based medium, stability in catalyst paste of the bismuth compound (A) of the present invention were specific to the bismuth compound (A).

Effect of the Invention

According to the present invention, a cationic electrodeposition coating composition without using the organic tin compound, however still sustaining an equal or higher curability, corrosion resistance, and finishing property compared with those of the composition containing the organic tin compound; and a catalyst for the composition; can be provided.

DESCRIPTION OF THE PREFERRED EMBODIMENTS

Hereinafter, the present invention will be described in detail.

The electrodeposition coating composition of the present invention contains a catalyst for electrodeposition coating composition containing a bismuth compound (A), and a base resin (B).

<Catalyst for Electrodeposition Coating Composition>

The catalyst for electrodeposition coating composition of the present invention contains the bismuth compound (A).

<<Bismuth Compound (A)>>

The bismuth compound (A) is a compound having a ligand prepared from β-diketone represented by the following Chemical Formula (1).

Chemical Formula (1):

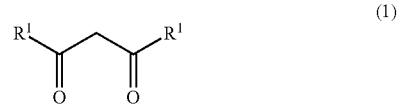

(wherein, a plurality of $R^1$ are the same or different from each other, and represent a hydrocarbon group, and the number of total carbon atoms in $R^1$ is 4 or larger)

As the hydrocarbon group represented by $R^1$, for example, saturated hydrocarbon groups such as a methyl group, an ethyl group, a propyl group, an isopropyl group, a butyl group, an isobutyl group, a t-butyl group, a pentyl group, a hexyl group, a cyclohexyl group, a heptyl group, an octyl group, a dodecanyl group, an octadecanyl group and the like; and unsaturated hydrocarbon groups such as a vinyl group, an allyl group, a prenyl group, a crotyl group, a cyclopentadienyl group, a phenyl group, a tolyl group, a xylyl group, a substituted aryl group and the like; can be mentioned. Among these, a hydrocarbon group having 1 to 12 carbon atoms is preferable, and a methyl group, a phenyl group, and a substituted aryl group is especially preferable.

In addition, as the combination of $R^1$ in which the number of total carbon atoms in two $R^1$ is 4 or larger, a combination of a methyl group and a hydrocarbon group with a number of carbon atoms of 3 or more, a combination of a hydrocarbon group with a number of carbon atoms of 2 or more and a hydrocarbon group with a number of carbon atoms of 2 or more, can be mentioned for example. More specifically, a combination of an ethyl group and an ethyl group, a combination of a methyl group and a t-butyl group, a combination of a methyl group and a phenyl group, a combination of a phenyl group and a phenyl group, a combination of a 4-t-butylphenyl group and a 4-methoxyphenyl group can be mentioned for example.

The bismuth compound (A) is preferably at least one bismuth compound having a group represented by the following Chemical Formula (4).

Chemical Formula (4):

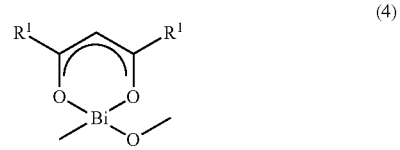

(wherein, $R^1$ represents the same as in Chemical Formula (1))

The bismuth compound (A) is more preferably a bismuth compound represented by the following Chemical Formula (5).

Chemical Formula (5):

(wherein, X represents —$OR^3$, or 1,3-dicarbonylate derived from β-diketone of Chemical Formula (1); at least one of the plurality of X is 1,3-dicarbonylate; and $R^3$ represents one of a hydrogen atom, an alkyl group, an acyl group, and —Bi—$X_2$, or two of $R^3$ are substituted by Bi atom to bond two oxygen atoms.)

The bismuth compound (A) is more preferably a bismuth compound represented by the following Chemical Formula (2) or Chemical Formula (3).

Chemical Formula (2)

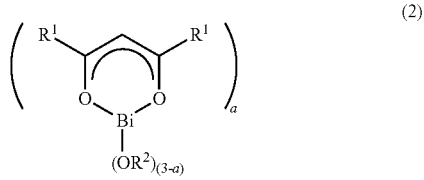

(2)

(wherein, $R^1$ represents the same as in Chemical Formula (1); $R^2$ represents one of a hydrogen atom, an alkyl group, an acyl group, and —Bi—(O—$R^2$)$_2$, or two of $R^2$ are substituted by Bi atom to bond two oxygen atoms; and a represents an integral number of 1, 2, or 3).

Chemical Formula (3):

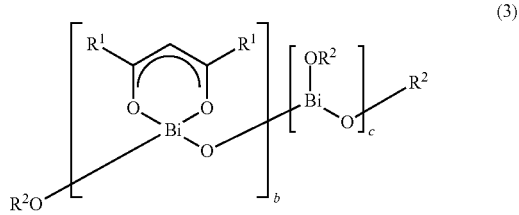

(3)

(wherein, $R^1$ represents the same as in Chemical Formula (1); $R^2$ represents the same as in Chemical Formula (2); and b and c represents an integral number of 1 or more.)

As the alkyl group represented by $R^2$ or $R^3$, for example, a methyl group, an ethyl group, a butyl group, an octyl group, a 2-ethyl hexyl group, an octadecanyl group and the like; can be mentioned. The ones having a number of carbon atoms of 1 to 18 are preferable.

As the acyl group represented by $R^2$ or $R^3$, for example, an acetyl group, a glycolyl group, a propionyl group, a lactoyl group, a butyryl group, a benzoyl group, a substituted aroyl group, an octanoyl group, an 2-ethylhexanoyl group, a stearoyl group and the like; can be mentioned. The ones having a number of carbon atoms of 1 to 18 are preferable. In addition, acyl groups of dibasic acid such as a malonyl group, a succinyl group, an adipoyl group and the like can be used to bond to the same Bi atom or two different Bi atoms.

As —Bi—(O—$R^2$)$_2$ represented by $R^2$, for example, the ones having a hydroxyl group, an alkoxy group, an acyloxy group through the intermediary of a Bi atom can be mentioned. In addition, two $R^2$ can be substituted with a Bi atom to bond two oxygen atoms to crosslink or to cyclize.

The number of the bismuth atoms in the bismuth compound (A) is not particularly limited, and can be 1 to 1000 for example, preferably 1 to 200, and further preferably 1 to 50.

The manufacturing method of the bismuth compound (A) is not particularly limited. For example, the bismuth compound (A) can be manufactured by allowing the β-diketone represented by Chemical Formula (1) to react with a bismuth alkoxide or with a bismuth oxide. Specifically, the bismuth compound (A) can be manufactured by the following method.

For example, the bismuth trialkoxide and the β-diketone are reacted by a molar ratio in the range of 0.1 to 10, preferably 0.2 to 3.3. As the bismuth trialkoxide, for example, bismuth trimethoxide, bismuth triethoxide, bismuth triisopropoxide, bismuth tributoxide and the like, can be mentioned.

The reaction solvent is not particularly limited. For example, alcohol solvents such as methanol, ethanol, isopropanol, butanol and the like; hydrocarbon solvents such as hexane, heptane, cyclohexane, toluene, xylene and the like; ether solvents such as diethyl ether, dibutyl ether, tetrahydrofuran and the like; ketone solvents such as acetone, methyl ethyl ketone, methyl isobutyl ketone and the like; ester solvents such as ethyl acetate, butyl acetate and the like; amide solvents such as DMF and the like; sulfoxide solvents such as DMSO and the like; and solvent mixtures thereof can be mentioned. The reaction temperature is not particularly limited. Generally, reaction is carried out in the temperature range of 0 to 200° C. The alcohol generated in the reaction system can be distilled out of the reaction system. Further, water and/or carboxylic acid can be added to the reaction solution. The reaction solution thus obtained is concentrated to obtain the bismuth compound (A). If necessary, the bismuth compound (A) can be purified by distillation, sublimation, washing with a solvent, reprecipitation, recrystallization and the like. The bismuth compound (A) may be substantially a single bismuth compound, or may be a mixture of several bismuth compounds, depending on the reaction conditions and the like. A particular compound can be isolated from the mixture and used as the catalyst, or the mixture can be used as it is as the catalyst. In either way, catalytic function can be achieved.

The content of the bismuth compound (A) in the electrodeposition coating composition of the present invention is not particularly limited. Generally, the bismuth compound (A) is contained by 0.2 to 10 parts by mass, preferably by 0.4 to 4.0 parts by mass with respect to 100 parts by mass of total solids of the base resin (B) and the curing agent (C) in the electrodeposition coating composition. The coating performance is not particularly affected even when the amount of addition is not in the afore-mentioned range, however, when the amount of addition is in the range of the afore-mentioned range of 0.2 to 10 parts by mass, the balance of properties required for the practical usage such as the curability, corrosion resistance, stability of the electrodeposition coating, and the like become preferable.

If necessary, the electrodeposition coating composition of the present invention may be added with a curing agent (C), a metal compound (D), a neutralizer (E), and other additives and the like, in addition to the afore-mentioned bismuth compound (A) and the base resin (B).

<<Base Resin (B)>>

As the base resin (B), any one of the epoxy based resin, acryl based resin, polybutadiene based resin, alkyd based resin, and polyester based resin may be used by introducing a cationic group. Among these, epoxy modified resin having a cationic group is preferable.

The afore-mentioned epoxy modified resin is manufactured by allowing an epoxy ring of an epoxy resin as a starting material to react with amine such as a primary amine and a secondary amine; a quaternary ammonium salt which is a reaction product of a tertiary amine and an acid; mixture of sulfide and an acid and the like; thereby opening the epoxy ring. Here, in the present specification, "cationic group" refers to a group which is cationic itself, and to a group which becomes cationic by adding an acid.

The polyepoxide compound used in the preparation of the afore-mentioned epoxy modified resin is a compound having at least two epoxy groups in one molecule. In general, the ones having a number average molecular weight of at least 200, preferably 400 to 4000, and more preferably 800 to 3000 are suitable. In particular, the one obtained by the reaction between a polyphenol compound and epichlorohydrin is preferable.

As the polyphenol compound used to form the afore-mentioned polyepoxide compound, 2,2-bis(4-hydroxyphenyl)propane, 1,1-bis(4-hydroxyphenyl)ethane, 1,1-bis(4-hydroxyphenyl)isobutane, 2,2-bis(4-hydroxy-t-butylphenyl) propane, 4,4-dihydroxybenzophenone, bis(2,4-dihydroxyphenyl)methane, bis(2-hydroxynaphtyl)methane, 1,5-dihydroxynaphthalene, 4,4-dihydroxydiphenylsulphone, phenol novolac, cresol novolac and the like can be mentioned.

The afore-mentioned polyepoxide compound may be partially reacted with polyol, polyetherpolyol, polyesterpolyol, polyamidoamine, polycarboxylic acid, polyisocyanate compound, and the like. In addition, the afore-mentioned polyepoxide compound may further be subjected to graft polymerization with ε-caprolactone, acryl monomer and the like.

As the amines used to open the epoxy ring and to introduce the amino group, for example, primary amines such as butylamine, octylamine, monoethanol amine, 2-(2-aminoethoxy)ethanol and the like; secondary amines such as diethylamine, dibutylamine, methyl butyl amine, diethanol amine, N-methyl ethanol amine and the like; polyamines such as ethylene diamine, diethylene triamine, ethyl amino ethyl amine, methyl amino propyl amine, N,N-dimethyl-amino propyl amine and the like; ketimine-blocked primary amino group containing secondary amines such as aminoethyl ethanolamine methyl isobutyl ketimine and the like can be used.

In addition, a quaternary ammonium salt which is a reaction product of a tertiary amine such as N,N-dimethyl ethanolamine, N-methyl diethanol amine, triethanol amine, triethyl amine and the like with an acid can be used for opening the epoxy ring.

As an example of sulfide used when opening the epoxy ring by the reaction with a mixture of sulfide and acid, diethyl sulfide, dipropyl sulfide, dibutyl sulfide, diphenyl sulfide, ethyl phenyl sulfide, tetramethylene sulfide, thiodiethanol, thiodipropanol, thiodibutanol, 1-(2-hydroxyethylthio)-2-propanol, 1-(2-hydroxyethylthio)-2,3-propane diol, 1-(2-hydroxyethylthio)-2-butanol and the like can be mentioned.

As the acid used in the afore-mentioned case, formic acid, acetic acid, propionic acid, lactic acid, dimethylol propionic acid, sulfamic acid and the like can be mentioned.

The base resin (B) may be either type of an externally cross-linking type or an internally (or self) cross-linking type. A cross-linking reaction requires a cross-linking portion and an active hydrogen containing portion which reacts with the cross-linking portion (for example, amino group, hydroxy group). Accordingly, when both of the cross-linking portion and the active hydrogen containing portion are contained in the base resin (B), it is an internally cross-linking type, and when only one of these portions are included in the base resin (B), it is an externally cross-linking type.

As the internally cross-linking type, a base resin (B) having a blocked isocyanate group and the like in its molecule can be mentioned. The blocked isocyanate group can be incorporated in the base resin (B) by a conventional method. For example, a free isocyanate group of a partially-blocked polyisocyanate compound can be allowed to react with the active hydrogen containing portion of the base resin.

<<Curing Agent (C)>>

When the base resin (B) is the externally cross-linking type resin, examples of the curing agent (C) used in combination are a cross-linking agent having a cross-linking portion (for example, a blocked polyisocyanate compound), and a compound having an active hydrogen containing portion (for example, a resin containing an amino group, a hydroxy group and the like). In particular, when the base resin (B) contains an active hydrogen containing portion, it is preferable to use a cross-linking agent as the curing agent, and when the base resin (B) contains a cross-linking portion, it is preferable to use a compound having an active hydrogen containing portion as the curing agent.

The blocked polyisocyanate compound can be obtained by allowing stoichiometric amounts of polyisocyanate compound and isocyanate blocking agent to go under an addition reaction.

As the polyisocyanate compound, aromatic polyisocyanate compounds such as tolylene diisocyanate, xylylene diisocyanate, phenylene diisocyanate, bis(isocyanatomethyl) cyclohexane, tetramethylene diisocyanate, hexamethylene diisocyanate, methylene diisocyanate, isophorone diisocyanate, polymethylene polyphenyl polyisocyanate; or aliphatic polyisocyanate compounds; and isocyanate terminated compounds obtained by allowing excess amount of these isocyanate compounds to react with low molecular compounds having active hydrogen (example: ethylene glycol, propylene glycol, trimethylolpropane, hexanetriol and castor oil), can be mentioned.

As the isocyanate blocking agent, the ones that adds to the isocyanate group of the polyisocyanate compound to block the isocyanate group is preferable. Here, the obtained blocked polyisocyanate compound should be stable under ambient temperature and release the blocking agent when heated to 100 to 200° C. to regenerate the isocyanate group.

As the blocking agent, halogenated hydrocarbons such as 1-chloro-2-propanol and ethylene chlorohydrin; heterocyclic alcohols such as furfuryl alcohol and alkyl group substituted furfuryl alcohol; phenols such as phenol, m-cresol, p-nitrophenol, p-chlorophenol, and nonylphenol; oximes such as methylethyl ketone oxime, methyl isobutyl ketone oxime, acetone oxime, and cyclohexanone oxime; active methylene compounds such as acetylacetone, ethyl acetoacetate and diethyl malonate; lactams such as ε-caprolactam; aliphatic alcohols such as methanol, ethanol, n-propanol, isopropanol, and 2-ethylhexanol; aromatic alcohols such as benzyl alcohol; and glycol ethers such as ethylene glycol monomethyl ether, ethylene glycol monoethyl ether, ethylene glycol monobutyl ether, diethylene glycol monomethyl ether, and diethylene glycol monobutyl ether; can be mentioned for example.

The dissociation temperatures of the blocking agents for alcohols and glycol ethers are higher than those for oximes, active methylene compounds, and lactams. However, alcohols and glycol ethers are inexpensive compared with other blocking agents. Therefore, they are generally used in the field of automobile bodies and the like, which are large in size and require economical efficiency.

The mass ratio of solids of the base resin (B)/curing agent (C) is preferably 20/80 to 90/10, more preferably 30/70 to 80/20.

<<Metal Compound (D)>>

As the metal compound (D), at least one compound selected from the group consisting of titanium compound, zinc compound, iron compound, magnesium compound, aluminum compound, and calcium compound can be mentioned for example.

As the titanium compound, compounds disclosed in WO 2013/125562, WO 2013/137174 can be mentioned for example. Titanium compound can be added alone to the electrodeposition coating composition of the present invention, or a composite catalyst of a bismuth compound (A) and a titanium compound can be prepared by the method disclosed in the afore-mentioned patents and then the electrodeposition coating composition can be prepared from the composite catalyst.

As the zinc compound, aliphatic and aromatic carboxylic acid salts such as zinc acetate, zinc lactate, zinc dimethylol propionate, and zinc benzoate which may be unsubstituted or substituted with various substituents; and zinc chelate complexes having ligands prepared from 1,3-dicarbonyl compounds such as 2,4-pentanedione, 1-phenyl-1,3-butanedione, 1,3-diphenyl-1,3-propanedione and the like can be mentioned for example.

As the iron compound, carboxylic acid salts such as iron (III) tris(2-ethylhexanoate); and iron chelate complexes having ligands prepared from 1,3-dicarbonyl compounds such as 2,4-pentanedione, 1-phenyl-1,3-butanedione, 1,3-diphenyl-1,3-propanedione and the like can be mentioned for example.

As the magnesium compound, carboxylic acid salts such as magnesium acetate and magnesium lactate; and magnesium chelate complexes having ligands prepared from 1,3-dicarbonyl compounds such as 2,4-pentanedione, 1-phenyl-1,3-butanedione, 1,3-diphenyl-1,3-propanedione and the like can be mentioned for example.

As the aluminum compound, phosphoric acid salts such as aluminum polyphosphate; and aluminum chelate complexes having ligands prepared from 1,3-dicarbonyl compounds such as 2,4-pentanedione, 1-phenyl-1,3-butanedione, 1,3-diphenyl-1,3-propanedione and the like can be mentioned for example.

As the calcium compound, carboxylic acid salts such as calcium acetate; and calcium chelate complexes having ligands prepared from 1,3-dicarbonyl compounds such as 2,4-pentanedione, 1-phenyl-1,3-butanedione, 1,3-diphenyl-1,3-propanedione and the like can be mentioned for example.

There is no particular limitation with respect to the content of the metal compound (D) in the electrodeposition coating composition of the present invention, and is generally 5 to 300 parts by mass, preferably 10 to 100 parts by mass with respect to 100 parts by mass of the bismuth compound (A). When the content is in the afore-mentioned range, properties of the electrodeposition coating composition can be improved.

<<Neutralizer (E)>>

The electrodeposition coating composition of the present invention may further contain a neutralizer (E) for dispersing the afore-mentioned components in water. As the neutralizer (E), aliphatic carboxylic acids such as formic acid, acetic acid, propionic acid, and lactic acid; and sulfamic acid and the like can be mentioned for example. The amount of the neutralizer (E) differs depending on the amount of the amino group in the base resin (B), and should be sufficient for dispersing the components in water and capable of maintaining the pH value of the electrodeposition coating in the range of 3.0 to 9.0. In the present invention, the equivalent amount of the neutralizer (E) necessary for neutralizing the amino group contained in the base resin (B) is in the range of 0.25 to 1.5, preferably 0.5 to 1.25. When the amount is in such range, the finishing property, deposition property, and the curability at low temperature improve.

<<Other Additives>>

The electrodeposition coating composition of the present invention may further contain common additives used in coatings, such as a coloring pigment, an extender pigment, an organic solvent, a pigment dispersant, a coating surface conditioner, a surfactant, an antioxidant, and an ultraviolet absorber.

<Manufacturing Process of Electrodeposition Coating Composition>

The electrodeposition coating composition of the present invention can be manufactured by mixing the afore-mentioned components at once, however, it can also be manufactured by the following process.

For example, the base resin (B) is mixed with the curing agent (C), followed by the addition of the neutralizer (E). The mixture of the base resin (B), curing agent (C), and neutralizer (E) is dispersed in water alone or in a mixture of water and hydrophilic organic solvent as an aqueous medium to give an emulsion. Alternatively, the base resin (B) and the curing agent (C) are mixed, and then the mixture is dispersed in an aqueous solution added with the neutralizer (E) or in the solution mixture of water and hydrophilic organic solvent added with the neutralizer (E), to give the emulsion.

Then, to a cationic solution of base resin (B) for dispersing pigment catalyst prepared separately, predetermined amount of afore-mentioned bismuth compound (A), metal compound (D), other additives, pigment, pigment dispersant and the like were added, and the mixture was blended. Subsequently, the mixture was thoroughly dispersed until the solids in the mixture reached a certain particle diameter, thereby obtaining a pigment catalyst dispersion paste. Here, ordinary dispersing apparatus such as a ball mill and a sand mill can be used if necessary.

Lastly, the emulsion and a predetermined amount of the pigment catalyst dispersion paste are thoroughly mixed to give the electrodeposition coating composition.

<Coating Process of Electrodeposition Coating Composition>

The electrodeposition coating composition of the present invention can be coated on the surface of the intended substrate by electrodeposition.

Electrodeposition is generally carried out by diluting the electrodeposition coating composition with de-ionized water so that the solid content of the composition is approximately 5 to 40 mass %, followed by adjustment of the pH value of the composition to 3.0 to 9.0. The electrodeposition coating bath prepared as such, containing the electrodeposition coating composition of the present invention, is generally adjusted to a bath temperature of 15 to 45° C., and the electrodeposition is conducted with a load voltage of 100 to 400V.

There is no limitation with respect to the film thickness of the electrodeposition coating formed by using the electrodeposition coating composition of the present invention, and is generally 5 to 40 µm, preferably 10 to 30 µm, by the cured coating. Here, the baking temperature of the coating at the surface of the coated material is generally 100 to 200° C., preferably 140 to 180° C. In addition, the baking period is 5 to 60 minutes, preferably 10 to 30 minutes. It is preferable that the surface of the coated material is maintained.

EXAMPLE

Hereinafter, the present invention will be explained in detail with reference to Examples. The present invention shall not be limited to these Examples. Here, "parts" and "%" mean "parts by mass" and "mass %", respectively.

<Preparation of Bismuth Compound (A)>

The bismuth compound (A) was prepared in accordance with the Preparative Examples 1 to 10 and Comparative Preparative Examples 1 to 2. The details of the Preparative Examples and Comparative Preparative Examples are summarized in Table 1.

TABLE 1

Preparation of Bismuth Compound (A)

preparation procedure of bismuth compound (A)

| Preparative Example | β diketone (a-11) | bismuth compound (a-13) | molar ratio (a-11)/(a-13) | reaction solvent | reaction temperature reaction time | $H_2O$ | molar ratio $H_2O$/(a-13) |
|---|---|---|---|---|---|---|---|
| 1 | 3,5-heptadione 13.2 g(0.10 mol) | Bi(OEt)$_3$ solution 300 g(0.10 mol) | 1/1 | toluene, ethanol | after dropwise addition of(a-11) 20 to 30° C. 1 h | 5.4 g (0.30 mol) | 3/1 |
| 2 | 5,5-dimethyl-2,4-hexadione 14.2 g(0.10 mol) | Bi(OEt)$_3$ solution 300 g(0.10 mol) | 1/1 | toluene, ethanol | after dropwise addition of(a-11) 20 to 30° C. 1 h | 5.4 g (0.30 mol) | 3/1 |
| 3 | 1-phenyl-1,3-butanedione 19.4 g(0.12 mol) | Bi(OEt)$_3$ solution 300 g(0.10 mol) | 1.2/1 | toluene, ethanol | after dropwise addition of(a-11) 20 to 30° C. 1 h | 3.6 g (0.20 mol) | 2/1 |
| 4 | 1-phenyl-1,3-butanedione 16.2 g(0.10 mol) | Bi(OEt)$_3$ solution 300 g(0.10 mol) | 1/1 | toluene, ethanol | after dropwise addition of(a-11) 20 to 30° C. 1 h | 5.4 g (0.30 mol) | 3/1 |
| 5 | 1-phenyl-1,3-butanedione 4.9 g(0.030 mol) | Bi(OEt)$_3$ solution 300 g(0.10 mol) | 0.3/1 | toluene, ethanol | after dropwise addition of(a-11) 20 to 30° C. 1 h | 5.4 g (0.30 mol) | 3/1 |
| 6 | 1,3-diphenyl-1,3-propanedione 33.7 g(0.15 mol) | Bi(OEt)$_3$ solution 150 g(0.050 mol) | 3/1 | toluene, ethanol | after dropwise addition of(a-11), 20 to 30° C. 1 h, followed by concentration at normal pressure to 100° C. | | |
| 7 | 1,3-diphenyl-1,3-propanedione 18.0 g(0.080 mol) | Bi(OEt)$_3$ solution 300 g(0.10 mol) | 0.8/1 | toluene, ethanol | after dropwise addition of(a-11), 20 to 30° C. 1 h, followed by concentration at normal pressure to 100° C. | 4.5 g (0.25 mol) | 2.5/1 |
| 8 | 1,3-diphenyl-1,3-propanedione 11.2 g(0.050 mol) | Bi(OEt)$_3$ solution 300 g(0.10 mol) | 0.5/1 | toluene, ethanol | after dropwise addition of (a-11), 20 to 30° C. 1 h, followed by concentration at normal pressure to 100° C. | 5.4 g (0.30 mol) | 3/1 |
| 9 | 1,3-diphenyl-1,3-propanedione 33.6 g(0.15 mol) | Bi$_2$O$_3$ 11.7 g(0.025 mol) | 6/1 | H$_2$O | 100° C., 5 h | | |
| 10 | 1-(4-t-butylphenyl)-3-(4-methoxyphenyl)-1,3-propanedione 15.5 g(0.050 mol) | Bi(OEt)$_3$ solution 150 g(0.050 mol) | 1/1 | toluene, ethanol | after dropwise addition of(a-11), 20 to 30° C. 1 h, followed by concentration at normal pressure to 100° C. | 2.0 g (0.11 mol) | 2.2/1 |
| Comparative Preparative Example 1 | acetylacetone 15.0 g(0.15 mol) | Bi(OEt)$_3$ solution 150 g(0.050 mol) | 3/1 | toluene, ethanol | after dropwise addition of(a-11) 20~to 30° C. 1 h | | |
| Comparative Preparative Example 2 | acetylacetone 10.0 g(0.10 mol) | Bi(OEt)$_3$ solution 300 g(0.10 mol) | 1/1 | toluene, ethanol | after dropwise addition of(a-11) 20~30° C. 1 h | 5.4 g (0.30 mol) | 3/1 |

| Preparative Example | preparation procedure of bismuth compound (A) reaction temperature reaction time | after-treatment conditions | bismuth compound (A) appearance yield | Bi content analytic value | Ref. |
|---|---|---|---|---|---|
| 1 | after dropwise addition of H$_2$O 20~30° C. 1 h | condensation followed by heptane reprecipitation and filtration | pale yellow solid 18.2 g | 62.5% | B1 |
| 2 | after dropwise addition of H$_2$O 20~30° C. 1 h | condensation followed by heptane reprecipitation and filtration | pale yellow solid 11.8 g | 64.0% | B2 |
| 3 | after dropwise addition of H$_2$O 20~30° C. 1 h | condensation followed by heptane reprecipitation and filtration | pale yellow solid 36.0 g | 56.3% | B3 |
| 4 | after dropwise addition of H$_2$O 20~30° C. 1 h | condensation followed by heptane reprecipitation and filtration | pale yellow solid 32.1 g | 60.4% | B4 |
| 5 | after dropwise addition of H$_2$O 20~30° C. 1 h | condensation followed by heptane reprecipitation and filtration | pale yellow solid 28.5 g | 73.4% | B5 |
| 6 | | condensation followed by addition of heptane and condensation to dryness | yellow solid 43.7 g | 23.8% | B6 |

TABLE 1-continued

Preparation of Bismuth Compound (A)

| | | | | | |
|---|---|---|---|---|---|
| 7 | after dropwise addition of H₂O 20~30° C. 1 h | condensation followed by heptane reprecipitation and filtration | yellow solid 37.3 g | 52.5% | B7 |
| 8 | after dropwise addition of H₂O 20~30° C. 2 h | condensation followed by heptane reprecipitation and filtration | yellow solid 32.0 g | 60.4% | B8 |
| 9 | | filtration and washing with heptane | yellow solid 13.8 g | 73.5% | B9 |
| 10 | after dropwise addition of H₂O 20~30° C. 3 h | vaccum condensation to dryness | yellow solid 26.5 g | 40.1% | B10 |
| Comparative Preparative Example 1 | | vaccum condensation to dryness | pale yellow solid 24.2 g | 43.0% | RB1 |
| Comparative Preparative Example 2 | after dropwise addition of H₂O 20~30° C. 1 h | condensation followed by heptane reprecipitation and filtration | pale yellow solid 29.8 g | 70.0% | RB2 |

Preparative Example 1

Under nitrogen atmosphere, to a 10 liter four-necked round-bottom flask equipped with a stirring apparatus, a thermometer, and a cooler, bismuth chloride (500 g, 1.58 mol, available from Wako Pure Chemical Industries, Ltd.), ethanol (365 g), and toluene (2175 g) were added. The mixture was agitated, and was heated to raise the temperature, followed by 30 minutes of reflux. Subsequently, 20% sodium ethoxide ethanol solution (1620 g, 4.76 mol, available from Wako Pure Chemical Industries, Ltd.) was added in a dropwise manner under reflux by heating for 4 hours, followed by 3 hours of reflux by heating. Then, the mixture was cooled to 20° C. with agitation, and the insoluble matters were removed by suction filtration under nitrogen atmosphere, thereby obtaining a bismuth triethoxide solution (4340 g). The Bi concentration by EDTA titration was 0.336 mmol/g, and the yield based on Bi was 92.3%.

Under nitrogen atmosphere, to a 1 liter four-necked round-bottom flask equipped with a stirring apparatus, a thermometer, and a cooler, the bismuth triethoxide solution (300 g, 0.10 mol) was added, and 3,5-heptanedione (13.2 g, 0.10 mol) shown by Chemical Formula (6) was added in a dropwise manner for 15 minutes in an internal temperature range of 20 to 30° C. The mixture was further stirred for 1 hour in the same temperature range. Subsequently, ion exchanged water (5.4 g, 0.30 mol) was added in a dropwise manner for 5 minutes in an internal temperature range of 20 to 30° C. The mixture was further stirred for 1 hour in the same temperature range. The reaction solution was transferred to a 1 liter eggplant flask, and was subjected to vacuum concentration in a 50° C. hot water bath under heating, thereby obtaining a concentrated solution (62 g). To the flask containing the concentrated solution, heptane (40 g) was added in a dropwise manner for 10 minutes, and the mixture was agitated for 10 minutes. The slurry solution thus obtained was subjected to suction filtration to give a pale yellow wet solid. The wet solid was subjected to vacuum drying (temperature of the hot water bath: 60° C., decompression degree: 10 to 20 mmHg) for 4 hours, thereby obtaining a dry pale yellow solid (18.2 g). The Bi content of the pale yellow solid bismuth compound (A) obtained by EDTA titration analysis was 65.2%.

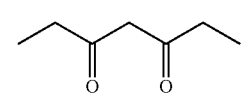

(6)

Preparative Example 2

Under nitrogen atmosphere, to a 1 liter four-necked round-bottom flask equipped with a stirring apparatus, a thermometer, and a cooler, the bismuth triethoxide solution (300 g, 0.10 mol) prepared in Preparative Example 1 was added, and 5,5-dimethyl-2,4-hexanedione (14.2 g, 0.10 mol) shown by Chemical Formula (7) was added in a dropwise manner for 15 minutes in an internal temperature range of 20 to 30° C. The mixture was further stirred for 1 hour in the same temperature range. Subsequently, ion exchanged water (5.4 g, 0.30 mol) was added in a dropwise manner for 5 minutes in an internal temperature range of 20 to 30° C. The mixture was further stirred for 1 hour in the same temperature range. The reaction solution was transferred to a 1 liter eggplant flask, and was subjected to vacuum concentration in a 50° C. hot water bath under heating, thereby obtaining a concentrated solution (68 g). To the flask containing the concentrated solution, heptane (20 g) was added in a dropwise manner for 10 minutes, and the mixture was agitated for 10 minutes. The slurry solution thus obtained was subjected to suction filtration to give a pale yellow wet solid. The wet solid was subjected to vacuum drying (temperature of the hot water bath: 60° C., decompression degree: 10 to 20 mmHg) for 4 hours, thereby obtaining a dry pale yellow solid (11.8 g). The Bi content of the pale yellow solid bismuth compound (A) obtained by EDTA titration analysis was 64.0%.

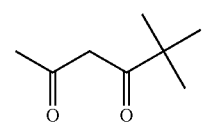

(7)

Preparative Example 3

Under nitrogen atmosphere, to a 1 liter four-necked round-bottom flask equipped with a stirring apparatus, a thermometer, and a cooler, the bismuth triethoxide solution (300 g, 0.10 mol) prepared in Preparative Example 1 was added, and a solution prepared by dissolving 1-phenyl-1,3-butanedione (19.4 g, 0.12 mol) shown by Chemical Formula (8) in toluene (50 g) was added in a dropwise manner for 30 minutes in an internal temperature range of 20 to 30° C. The mixture was further stirred for 2 hours in the same temperature range. Subsequently, ion exchanged water (3.6 g, 0.20 mol) was added in a dropwise manner for 5 minutes in an internal temperature range of 20 to 30° C. The mixture was further stirred for 1 hour in the same temperature range. The reaction solution was transferred to a 1 liter eggplant flask, and was subjected to vacuum concentration in a 50° C. hot water bath under heating, thereby obtaining a concentrated solution (57 g). To a 3 liter four-necked round-bottom flask equipped with a stirring apparatus, a thermometer, and a cooler, heptane (700 g) was added, and then the concentrated solution was added with agitation in a dropwise manner for 30 minutes in an internal temperature range of 20 to 30° C., followed with washing with toluene (10 g). The mixture was further stirred for 1 hour in the same temperature range. The slurry solution thus obtained was subjected to suction filtration to give a pale yellow wet solid. The wet solid was subjected to vacuum drying (temperature of the hot water bath: 60° C., decompression degree: 10 to 20 mmHg) for 4 hours, thereby obtaining a dry pale yellow solid (36.0 g). The Bi content of the pale yellow solid bismuth compound (A) obtained by EDTA titration analysis was 56.3%.

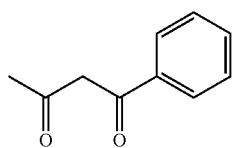

(8)

Preparative Examples 4 to 5

The amount of 1-phenyl-1,3-butanedione and water used were altered, thereby obtaining bismuth compound (a) in a similar manner as Preparative Example 3. The results are shown in Table 1.

Preparative Example 6

Under nitrogen atmosphere, to a 1 liter four-necked round-bottom flask equipped with a stirring apparatus, a thermometer, a distillation head, and a cooler, the bismuth triethoxide solution (150 g, 0.050 mol) prepared in Preparative Example 1 was added, and a solution prepared by dissolving 1,3-diphenyl-1,3-propanedione (33.7 g, 0.15 mol) shown by Chemical Formula (9) in toluene (180 g) was added in a dropwise manner for 30 minutes in an internal temperature range of 20 to 30° C. The mixture was further stirred for 1 hour in the same temperature range. The solvent was removed under normal pressure with agitation by heating the oil bath until the internal temperature reaches 100° C. The concentrated solution was transferred to a 500 mL eggplant flask, and was subjected to vacuum concentration in a 60° C. hot water bath under heating, thereby obtaining a concentrated solution (51 g). To the flask containing the concentrated solution, heptane (50 g) was added to allow precipitation of yellow solid, followed by vacuum concentration to dryness (temperature of the hot water bath: 60° C., decompression degree: 10 to 20 mmHg) for 6 hours, thereby obtaining a dry yellow solid (43.7 g). The Bi content of the yellow solid bismuth compound (A) obtained by EDTA titration analysis was 23.8%.

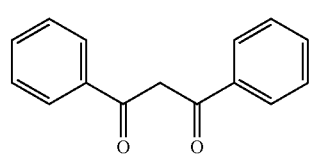

(9)

Preparative Example 7

Under nitrogen atmosphere, to a 1 liter four-necked round-bottom flask equipped with a stirring apparatus, a thermometer, a distillation head, and a cooler, the bismuth triethoxide solution (300 g, 0.10 mol) prepared in Preparative Example 1 was added, and a solution prepared by dissolving 1,3-diphenyl-1,3-propanedione (18.0 g, 0.080 mol) in toluene (100 g) was added in a dropwise manner for 30 minutes in an internal temperature range of 20 to 30° C. The mixture was further stirred for 1 hour in the same temperature range. The solvent was removed under normal pressure with agitation by heating the oil bath until the internal temperature reaches 100° C. The concentrated solution was then cooled with agitation to the internal temperature of 20° C., followed with addition of ion exchanged water (4.5 g, 0.25 mol) in a dropwise manner for 5 minutes in an internal temperature range of 20 to 30° C. The mixture was further stirred for 1 hour in the same temperature range. The reaction solution was transferred to a 500 mL eggplant flask, and was subjected to vacuum concentration in a 60° C. hot water bath under heating, thereby obtaining a concentrated solution (60 g). To a 3 liter four-necked round-bottom flask equipped with a stirring apparatus, a thermometer, and a cooler, heptane (700 g) was added, and then the concentrated solution was added with agitation in a dropwise manner for 30 minutes in an internal temperature range of 20 to 30° C., followed with washing with toluene (10 g). The mixture was further stirred for 1 hour in the same temperature range. The slurry solution thus obtained was subjected to suction filtration to give a pale yellow wet solid. The wet solid was subjected to vacuum drying (temperature of the hot water bath: 60° C., decompression degree: 10 to 20 mmHg) for 4 hours, thereby obtaining a dry pale yellow solid (37.3 g). The Bi content of the pale yellow solid bismuth compound (A) obtained by EDTA titration analysis was 52.5%.

Preparative Example 8

The amount of 1,3-diphenyl-1,3-propanedione and water used were altered, thereby obtaining bismuth compound (a) in a similar manner as Preparative Example 7. The results are shown in Table 1.

Preparative Example 9

To a 300 mL four-necked round-bottom flask equipped with a stirring apparatus, a thermometer, and a cooler, bismuth oxide $Bi_2O_3$ (11.7 g, 0.025 mol), 1,3-diphenyl-1,3-propanedione (33.6 g, 0.15 mol), and ion exchanged water were added, and the mixture was agitated. The temperature of the mixture was raised to 100° C. with agitation, and was allowed to react for 5 hours at the same temperature. Subsequently, the mixture was cooled to 25° C., followed by addition of toluene (40 g) to give a slurry. The slurry was subjected to suction filtration to give a yellow wet solid. The solid was transferred to a 300 mL eggplant flask, followed with addition of heptane (100 g), and the mixture was agitated for 15 minutes to obtain a slurry. The slurry was subjected to suction filtration to give a yellow wet solid. The wet solid was subjected to vacuum drying (temperature of the hot water bath: 60° C., decompression degree: 10 to 20 mmHg) for 4 hours, thereby obtaining a dry pale yellow solid (13.8 g). The Bi content of the pale yellow solid bismuth compound (A) obtained by EDTA titration analysis was 73.5%.

Preparative Example 10

Under nitrogen atmosphere, to a 500 mL four-necked round-bottom flask equipped with a stirring apparatus, a thermometer, a distillation head, and a cooler, the bismuth triethoxide solution (150 g, 0.050 mol) prepared in Preparative Example 1 was added, and a solution prepared by dissolving 1-(4-t-butylphenyl)-3-(4-methoxyphenyl)-1,3-propanedione (15.5 g, 0.050 mol) represented by Chemical Formula (10) in toluene (90 g) was added in a dropwise manner for 30 minutes in an internal temperature range of 20 to 30° C. The mixture was further stirred for 1 hour in the same temperature range. The solvent was removed under normal pressure with agitation by heating the oil bath until the internal temperature reaches 100° C. The concentrated solution was then cooled with agitation to the internal temperature of 20° C., followed with addition of ion exchanged water (2.0 g, 0.11 mol) in a dropwise manner for 1 minute in an internal temperature range of 20 to 30° C. The mixture was further stirred for 3 hours in the same temperature range. The reaction solution was transferred to a 500 mL eggplant flask, and was subjected to vacuum concentration to dryness (temperature of the hot water bath: 60° C., decompression degree: 10 to 20 mmHg) for 8 hours, thereby obtaining a dry yellow solid (26.5 g). The Bi content of the yellow solid bismuth compound (A) obtained by EDTA titration analysis was 40.1%.

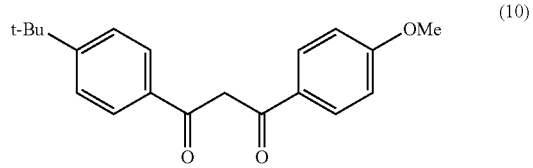 [SMILES: COc1ccc(C(=O)CC(=O)c2ccc(C(C)(C)C)cc2)cc1]

Comparative Preparative Example 1

Bi(Acac)$_3$, Tris(2,4-Pentanedionato)Bismuth(III)

Under nitrogen atmosphere, to a 500 mL four-necked round-bottom flask equipped with a stirring apparatus, a thermometer, and a cooler, the bismuth triethoxide solution (150 g, 0.050 mol) prepared in Preparative Example 1 was added, and acetylacetone (15.0 g, 0.15 mol) represented by Chemical Formula (11) was added in a dropwise manner for 30 minutes in an internal temperature range of 20 to 30° C. The mixture was further stirred for 1 hour in the same temperature range. The reaction solution was transferred to a 500 mL eggplant flask, and was subjected to vacuum concentration in a 50° C. hot water bath under heating, thereby obtaining a concentrated solution (41 g). To the flask containing the concentrated solution, heptane (50 g) was added. The mixture thus obtained was subjected to vacuum concentration to dryness (temperature of the hot water bath: 60° C., decompression degree: 10 to 20 mmHg) for 6 hours, thereby obtaining a dry pale yellow solid (24.2 g). The Bi content of the pale yellow solid bismuth compound (A) obtained by EDTA titration analysis was 43.0%.

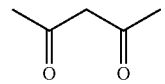

Comparative Preparative Example 2

Bismuth Acetylacetone Complex; Bismuth Content 70%

Under nitrogen atmosphere, to a 1 liter four-necked round-bottom flask equipped with a stirring apparatus, a thermometer, and a cooler, the bismuth triethoxide solution (300 g, 0.10 mol) prepared in Preparative Example 1 was added, and acetylacetone (10.0 g, 0.10 mol) was added in a dropwise manner for 15 minutes in an internal temperature range of 20 to 30° C. The mixture was further stirred for 1 hour in the same temperature range. Ion exchanged water (5.4 g, 0.30 mol) was added in a dropwise manner for 5 minutes in an internal temperature range of 20 to 30° C., and the mixture was further stirred for 1 hour in the same temperature range. The reaction solution was transferred to a 1 liter eggplant flask, and was subjected to vacuum concentration in a 50° C. hot water bath under heating, thereby obtaining a concentrated solution (62 g). To the flask containing the concentrated solution, heptane (300 g) was added in a dropwise manner for 30 minutes, and the mixture was agitated for 10 minutes. The slurry solution thus obtained was subjected to suction filtration to give a pale yellow wet solid. The wet solid was subjected to vacuum drying (temperature of the hot water bath: 60° C., decompression degree: 10 to 20 mmHg) for 4 hours, thereby obtaining a dry pale yellow solid (29.6 g). The Bi content of the pale yellow solid bismuth compound (A) obtained by EDTA titration analysis was 70.0%.

<Preparation of Base Resin (B)>

Preparative Example 11 For Main Binder

Under nitrogen atmosphere, to a 3 liter four-necked flask equipped with a stirring apparatus, a thermometer, and a cooler, epoxy resin "jER1004AF" (1425 g, 1.59 mol by epoxy conversion, available from Mitsubishi Chemical Corporation, epoxy equivalent: 896 g/eq, average molecular weight: approximately 1650) and ethylene glycol monobutylether (406 g, hereinafter referred to as butyl cellosolve) were added, and the reaction mixture was heated with an oil bath of 120° C. and stirred to dissolve the resin. Diethanolamine (175.5 g, 1.67 mol) was added in a dropwise manner for 1 hour using a dropping funnel in an internal temperature range of 95 to 115° C. The dropping funnel was rinsed with butyl cellosolve (64 g). The reaction mixture was further stirred for 16 hours in the internal temperature range of 115 to 120° C. Subsequently, while stirring, butyl cellosolve (597 g) was added in a dropwise manner for 30 minutes, and the reaction mixture was then allowed to cool down to 50° C. while stirring. A butyl cellosolve solution of diethanolamine-adduct epoxy resin B-1 (2667 g, solid content 60%) was thus obtained. Hydroxyl value of the resin solids obtained by measuring the hydroxyl value of the solution B-1 and then substracting the hydroxyl value of the butyl cellosolve solvent therefrom, was 199 mg KOH/g (3.55 mmol/g when converted to OH group). The amine content by calculation was 0.63 mmol/g.

Preparation Example 12

Quaternary Ammonium Salt Resin Solution for Pigment Catalyst Dispersion

Under nitrogen atmosphere, to a 2 liter four-necked flask equipped with a stirring apparatus, a thermometer, and a cooler, tolylene diisocyanate (hereinafter referred to as TDI) (420.6 g, 2.41 mol) and methyl isobutyl ketone (hereinafter referred to as MIBK) (82 g) were added, and the mixture was heated with agitation to reach an internal temperature of 50° C. To the mixture, butyl cellosolve (285.4 g 2.41 mol) was added in a dropwise manner for 4 hours in an internal temperature range of 50 to 55° C. The reaction was allowed to proceed at 50° C. for 4 hours to give butyl cellosolve half blocked TDI (788 g).

Under nitrogen atmosphere, to a 1 liter four-necked flask equipped with a stirring apparatus, a thermometer, and a cooler, dimethyl ethanol amine (106.0 g, 1.19 mol) was added, and the butyl cellosolve half blocked TDI (394 g, 1.21 mol) was added with agitation in a dropwise manner for 2 hours in an internal temperature range of 25 to 50° C. The temperature of the mixture was raised to 80° C., and agitation was performed for 1 hour. Subsequently, while agitation, 75% lactic acid aqueous solution (142 g, 1.19 mol) was added in a dropwise manner for 1 hour in a temperature range of 75 to 85° C. Then, butyl cellosolve (88 g) was added, followed with agitation at 65 to 70° C. for 3 hours to give a quaternary agent (730 g).

Under nitrogen atmosphere, to a 3 liter four-necked flask equipped with a stirring apparatus, a thermometer, and a cooler, epoxy resin "jER1001AF" (378 g, 0.81 mol by epoxy conversion, available from Mitsubishi Chemical Corporation, epoxy equivalent: 468 g/eq, average molecular weight: approximately 900) was added. The resin was allowed to melt by heating with an oil bath of 120° C. under agitation. While agitation, the butyl cellosolve half blocked TDI (394 g) was added in a dropwise manner for 2 hours in an internal temperature range of 117 to 123° C. The mixture was further stirred for 2 hours in the same temperature range to allow reaction to proceed, and was then cooled to 90° C. While agitation, the quaternary agent (495 g, 0.81 mol) was added in a dropwise manner for 1 hour in a temperature range of 85 to 90° C. Subsequently, butyl cellosolve (136 g) was added and the mixture was allowed to react in a temperature range of 75 to 85° C. for 16 hours. Then, butyl cellosolve (500 g) was added for dilution, and the mixture was allowed to cool with agitation to 50° C., thereby obtaining a quaternary ammonium salt resin solution for pigment catalyst dispersion B-2 (1903 g, solid content 60%).

Preparation Example 13

Tertiary Sulfonium Salt Resin Solution for Pigment Catalyst Dispersion

Under nitrogen atmosphere, to a 1 liter four-necked flask equipped with a stirring apparatus, a thermometer, and a cooler, isophorone diisocyanate (hereinafter referred to as IPDI) (222.3 g, 1.00 mol) and MIBK (39.5 g) were added, and the mixture was heated with agitation to reach an internal temperature of 50° C. To the mixture, butyl cellosolve (118.2 g 1.00 mol) was added in a dropwise manner for 2 hours in an internal temperature range of 47 to 53° C. The reaction was allowed to proceed in the same temperature range for 10 hours to give butyl cellosolve half blocked IPDI (380 g).

Under nitrogen atmosphere, to a 500 mL four-necked flask equipped with a stirring apparatus, a thermometer, and a cooler, 2-mercaptoethanol (75.3 g, 0.96 mol) and MIBK (154 g) were added, and the mixture was agitated to obtain a homogeneous solution. To the mixture, dimethyl benzyl amine (0.39 g, 2.9 mol) was added, and the temperature of the mixture was raised to 50° C. with agitation. Subsequently, while agitation, glycidol (78.6 g, 1.06 mol) was added in a dropwise manner for 2 hours in a temperature range of 47 to 53° C., and the mixture was allowed to react for 5 hours in the same temperature range. The reaction solution was transferred to a 1 liter eggplant flask, and the solution was subjected to vacuum concentration (temperature of the hot water bath: 50° C., decompression degree: 10 to 20 mmHg) for 3 hours, thereby obtaining a light yellow viscous liquid of 1-(2-hydroxyehtylthio)-2,3-propane diol (163 g).

Under nitrogen atmosphere, to a 3 liter four-necked flask equipped with a stirring apparatus, a thermometer, and a cooler, epoxy resin "jER1001AF" (234.5 g, 0.50 mol by epoxy conversion, available from Mitsubishi Chemical Corporation, epoxy equivalent: 468 g/eq, average molecular weight: approximately 900) was added. The resin was allowed to melt by heating with an oil bath of 140° C. under agitation.

While agitation, the butyl cellosolve half blocked IPDI (190 g, 0.50 mol) was added in a dropwise manner for 1 hour in an internal temperature range of 137 to 143° C. The mixture was further stirred for 2 hours in the same temperature range, followed with addition of butyl cellosolve (100 g), and was then cooled to 70° C. While agitation, 1-(2-hydroxyehtylthio)-2,3-propane diol (83 g), dimethylol propionic acid (59 g, 0.5 mol), and ion exchanged water (60 g) were added. The mixture was agitated in an internal temperature range of 67 to 73° C. for 6 hours, followed by addition of butyl cellosolve (50 g). The mixture was allowed to react in a temperature range of 65 to 73° C. for 12 hours. Then, butyl cellosolve (134.5 g) was added for dilution, and the mixture was allowed to cool with agitation to 50° C., thereby obtaining a tertiary sulfonium salt resin solution for pigment catalyst dispersion (B-3) (910 g, solid content 60%)

<Preparation of Curing Agent (C) Blocked Polyisocyanate>

Preparative Example 14

Under nitrogen atmosphere, to a 3 liter four-necked flask equipped with a stirring apparatus, a thermometer, and a cooler, polymethylene polyphenyl polyisocyanate "Sumidur 44V20" (798 g, isocyanate group conversion 6.0 mol, available from Sumika Bayer Urethane Co., Ltd., isocyanate group content: 31.5%) was added. The mixture was heated to internal temperature of 95° C. while stirring. Subsequently, the heating was terminated, and butyl cellosolve (1063 g, 9.0 mol) was added in a dropwise manner for 2 hours while stirring in an internal temperature range of 95 to 120° C. Then, the reaction mixture was heated to an internal temperature range of 115 to 120° C. and was stirred for 5 hours. Subsequently, the heating was terminated, and sample was taken to check the disappearance of the absorption by the isocyanate group (2241 cm 1) by observing an IR spectrum. Then, while stirring, butyl cellosolve (290 g) was added in a dropwise manner for 15 minutes, and the reaction mixture was further stirred to cool down to 50° C. A butyl cellosolve solution of butyl cellosolve-blocked polymethylene polyphenyl polyisocyanate (2150 g, solid content 70%) was thus obtained. The blocked isocyanate group content of the solution by calculation was 2.79 mmol/g.

<Preparation of Emulsion Solution>

Preparative Example 15

The butyl cellosolve solution of diethanolamine-adduct epoxy resin B-1 (100 g, solid content 60%) obtained in Preparative Example 11, the butyl cellosolve solution of polymethylene polyphenyl polyisocyanate (128 g, solid content 70%) obtained in Preparative Example 14, and butyl cellosolve (21 g) were mixed well, and thus a butyl cellosolve solution of base resin (B) and curing agent (C) (solid content 60%) was prepared.

To a 3 liter beaker equipped with TK HOMOGENIZING MIXER MARK II Model 2.5 (available from PRIMIX Corporation), ion exchanged water (880 g), acetic acid (3.6 g), and butyl cellosolve (13 g) were added, and the mixture was stirred at 1000 rpm. The rotating number of the homo-mixer was set to 12000 rpm, and the internal temperature was maintained in the temperature range of 15 to 20° C., while adding the butyl cellosolve solution of base resin (B) and curing agent (C) in a dropwise manner for 6 hours. Then, the mixture was stirred for 6 hours in the same temperature range, to obtain an emulsion solution (1145 g, solid content 13%).

<Preparation of Metal Compound (D)>

Preparative Example 16

Titanium Compound D1

Titanium compound D1 having a ligand prepared from 1-phenyl-1,3-butanedione was obtained by the method disclosed in Preparative Example 3 of WO 2013/125562.

Preparative Example 17

Titanium Compound D2

Titanium compound D2 having a ligand prepared from 1,3-diphenyl-1,3-propanedione was obtained by the method disclosed in Preparative Example 5 of WO 2013/125562.

Preparative Example 18

Zinc Compound D3

Under nitrogen atmosphere, to a 300 mL four-necked flask equipped with a stirring apparatus, a thermometer, and a cooler, 1-phenyl-1,3-butanedione (23.8 g, 0.15 mol) was added, followed by addition of THF (45 g). The mixture was agitated to dissolve 1-phenyl-1,3-butanedione. A solution prepared by dissolving sodium hydroxide (5.9 g, 0.15 mol) in methanol (50 g) was added in a dropwise manner for 30 minutes in an internal temperature range of 15 to 20° C. The mixture was further stirred for 30 minutes in the same temperature range. Subsequently, half of a solution prepared by dissolving zinc chloride (10.0 g, 0.07 mol) in ion exchanged water (25 g) was added in a dropwise manner for 5 minutes in an internal temperature range of 20 to 25° C. Then, methanol (25 g) and THF (10 g) were added, and the remaining half of the zinc chloride aqueous solution was added in a dropwise manner for 5 minutes in the same temperature range. The mixture was agitated for 1 hour. The slurry thus obtained was subjected to suction filtration, and the filtrate was washed with ion exchanged water (100 g) for three times to give a wet solid. The wet solid was subjected to vacuum drying (temperature of the hot water bath: 80° C., decompression degree: 10 to 20 mmHg) for 4 hours, thereby obtaining the zinc compound D3 having a ligand prepared from 1-phenyl-1,3-butane dione (24.7 g).

<Preparation of Pigment Catalyst Dispersion Paste>

The quaternary ammonium salt resin solution for pigment catalyst dispersion B-2 (250 g, solid content 60%) obtained in Preparative Example 12, ion exchanged water (594 g), and "NONION K-220" (6 g, surfactant available from NOF Corporation) were mixed well to prepare a solution for pigment catalyst dispersion paste B-2 (850 g, solid content 17.6%).

The tertiary sulfonium salt resin solution for pigment catalyst dispersion B-3 (250 g, solid content 60%) obtained in Preparative Example 13, ion exchanged water (594 g), and "NONION K-220" (6 g, surfactant available from NOF Corporation) were mixed well to prepare a solution for pigment catalyst dispersion paste B-3 (850 g, solid content 17.6%).

TABLE 2

Preparation of Pigment Catalyst Dispersion Paste

| | | pigment catalyst dispersion paste | | | | | | | | | | | | | | | |
|---|---|---|---|---|---|---|---|---|---|---|---|---|---|---|---|---|---|
| | | P1 | P2 | P3 | P4 | P5 | P6 | P7 | P8 | P9 | P10 | P11 | P12 | P13 | P14 | P15 | P16 |
| solution for pigment catalyst dispersion paste B-2 | | 28.4 | 28.4 | 28.4 | 28.4 | 28.4 | 28.4 | 28.4 | 28.4 | 28.4 | 28.4 | | | | | 28.4 | 28.4 |
| solution for pigment catalyst dispersion paste B-3 | | | | | | | | | | | | 28.4 | 28.4 | 28.4 | 28.4 | | |
| bismuth compound (A) | B1 | 5.0 | | | | | | | | | | 5.0 | | | | | |
| | B2 | | 5.0 | | | | | | | | | | 5.0 | | | | |
| | B3 | | | 5.0 | | | | | | | | | | 5.0 | | | |
| | B4 | | | | 5.0 | | | | | | | | | | 5.0 | 5.0 | |
| | B5 | | | | | 5.0 | | | | | | | | | | | |
| | B6 | | | | | | 5.0 | | | | | | | | | | |
| | B7 | | | | | | | 5.0 | | | | | | | | | 2.5 |
| | B8 | | | | | | | | 5.0 | | | | | | | | |

TABLE 2-continued

Preparation of Pigment Catalyst Dispersion Paste

|  |  | B9 |  |  |  |  | 5.0 |  |  |  |  |  |
|---|---|---|---|---|---|---|---|---|---|---|---|---|
|  |  | B10 |  |  |  |  |  | 5.0 |  |  |  |  |
| metal compound (D) |  | D1 |  |  |  |  |  |  |  |  | 2.5 |  |
|  |  | D2 |  |  |  |  |  |  |  |  |  | 2.5 |
|  |  | D3 |  |  |  |  |  |  |  |  |  |  |
| bismuth compound for comparison |  | RB1 |  |  |  |  |  |  |  |  |  |  |
|  |  | RB2 |  |  |  |  |  |  |  |  |  |  |
|  |  | $Bi_2O_3$ |  |  |  |  |  |  |  |  |  |  |
|  |  | $Bi(OH)_3$ |  |  |  |  |  |  |  |  |  |  |
|  |  | $BiO(OCOCH_3)$ |  |  |  |  |  |  |  |  |  |  |
| organic tin compound for comparison |  | DOTO |  |  |  |  |  |  |  |  |  |  |

| | | pigment catalyst dispersion paste | | | | | | | | | | | | | | |
|---|---|---|---|---|---|---|---|---|---|---|---|---|---|---|---|---|
| | | P17 | P18 | P19 | P20 | P21 | P22 | P23 | RP1 | RP2 | RP3 | RP4 | RP5 | RP6 | RP7 | RP8 |
| solution for pigment catalyst dispersion paste B-2 | | 28.4 | 28.4 | 28.4 | | | | | 28.4 | | 28.4 | | 28.4 | 28.4 | 28.4 | 28.4 |
| solution for pigment catalyst dispersion paste B-3 | | | | | 28.4 | 28.4 | 28.4 | 28.4 | | 28.4 | | 28.4 | | | | |
| bismuth compound (A) | B1 | | | | | | | | | | | | | | | |
| | B2 | | | | | | | | | | | | | | | |
| | B3 | | | | | | | | | | | | | | | |
| | B4 | 3.5 | | | 2.5 | | | | | | | | | | | |
| | B5 | | | | | | | | | | | | | | | |
| | B6 | | | | | | | | | | | | | | | |
| | B7 | | 3.5 | 1.5 | | 2.0 | 2.5 | 1.0 | | | | | | | | |
| | B8 | | | | | | | 1.0 | | | | | | | | |
| | B9 | | | 1.5 | | | | 1.0 | | | | | | | | |
| | B10 | | | | | | | | | | | | | | | |
| metal compound (D) | D1 | | | | | 2.5 | 3.0 | | | | | | | | | |
| | D2 | | | | 2.0 | | 2.5 | 2.0 | | | | | | | | |
| | D3 | 1.5 | 1.5 | | | | | | | | | | | | | |
| bismuth compound for comparison | RB1 | | | | | | | | 5.0 | 5.0 | | | | | | |
| | RB2 | | | | | | | | | | 5.0 | 5.0 | | | | |
| | $Bi_2O_3$ | | | | | | | | | | | | 5.0 | | | |
| | $Bi(OH)_3$ | | | | | | | | | | | | | 5.0 | | |
| | $BiO(OCOCH_3)$ | | | | | | | | | | | | | | 5.0 | |
| organic tin compound for comparison | DOTO | | | | | | | | | | | | | | | 5.0 |

Preparative Example P1

To a 100 ml flask equipped with a mixer, the solution for pigment catalyst dispersion paste B-2 (28.4 g), bismuth compound (A) B1 obtained in Preparation Example 1 (5.0 g) were added, and the mixture was mixed for 10 minutes. Then, glass beads (60 g, particle diameter: 2.5 mm to 3.5 mm) were added, and the mixture was further stirred for 2 hours. Subsequently, the glass beads were removed by filtration to give the pigment catalyst dispersion paste P1.

Preparative Examples P2 to P23

The solution for pigment catalyst dispersion paste, bismuth compound (A), and metal compound (D) were formulated as shown in Table 2, and the pigment catalyst dispersion pastes P2 to P23 were obtained by the process similar to Preparative Example P1.

Comparative Preparative Example RP1

Bismuth compound RB1 (5.0 g) was used in place of the bismuth compound of the present invention to give the pigment catalyst dispersion paste RP1 by the process similar to Preparative Example P1.

Comparative Preparative Examples RP2 to RP8

The type and amount of the solution for the pigment catalyst dispersion paste, bismuth compound prepared in the Comparative Preparative Examples, comparative bismuth compounds, and comparative organic tin compounds were altered as shown in Table 2, and the pigment catalyst dispersion pastes RP2 to RP28 were obtained by the process similar to Preparative Example P1.

<Preparation of Samples for Testing Storage Stability of Pigment Catalyst Dispersion Paste>

Pigment catalyst dispersion pastes obtained in Preparative Examples P1 to P23 and Comparative Preparative Examples RP1 to RP8 were placed in a glass sample bottle and sealed. The samples were stored at 35° C. for 30 days in a thermostatic chamber. The pastes stored were agitated and were confirmed whether they were re-dispersible or not.

Then the pastes were used for the preparation of electrodeposition coating composition and curing test.

<Preparation of Electrodeposition Coating Composition>

Examples 1 to 23 and Comparative Examples 1 to 8

The emulsion solution and the pigment catalyst dispersion paste shown in Table 3 were formulated by the ratio (parts by mass) shown in Table 3, and were mixed and dispersed, thereby preparing the electrodeposition coating composition.

TABLE 3

Electrodeposition Coating Composition. Electrodeposition Coating Curing Test

| | | Example | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| emulsion solution | | 250 | 250 | 250 | 250 | 250 | 250 | 250 | 250 | 250 | 250 | 250 | 250 | 250 | 250 | 250 | 250 |
| pigment catalyst dispersion paste (stored at 35° C. for 30 days) | P1 | 4.3 | | | | | | | | | | | | | | | |
| | P2 | | 4.3 | | | | | | | | | | | | | | |
| | P3 | | | 4.3 | | | | | | | | | | | | | |
| | P4 | | | | 4.3 | | | | | | | | | | | | |
| | P5 | | | | | 4.3 | | | | | | | | | | | |
| | P6 | | | | | | 4.3 | | | | | | | | | | |
| | P7 | | | | | | | 4.3 | | | | | | | | | |
| | P8 | | | | | | | | 4.3 | | | | | | | | |
| | P9 | | | | | | | | | 4.3 | | | | | | | |
| | P10 | | | | | | | | | | 4.3 | | | | | | |
| | P11 | | | | | | | | | | | 4.3 | | | | | |
| | P12 | | | | | | | | | | | | 4.3 | | | | |
| | P13 | | | | | | | | | | | | | 4.3 | | | |
| | P14 | | | | | | | | | | | | | | 4.3 | | |
| | P15 | | | | | | | | | | | | | | | 6.6 | |
| | P16 | | | | | | | | | | | | | | | | 6.6 |
| | P17 | | | | | | | | | | | | | | | | |
| | P18 | | | | | | | | | | | | | | | | |
| | P19 | | | | | | | | | | | | | | | | |
| | P20 | | | | | | | | | | | | | | | | |
| | P21 | | | | | | | | | | | | | | | | |
| | P22 | | | | | | | | | | | | | | | | |
| | P23 | | | | | | | | | | | | | | | | |
| | RP1 | | | | | | | | | | | | | | | | |
| | RP2 | | | | | | | | | | | | | | | | |
| | RP3 | | | | | | | | | | | | | | | | |
| | RP4 | | | | | | | | | | | | | | | | |
| | RP5 | | | | | | | | | | | | | | | | |
| | RP6 | | | | | | | | | | | | | | | | |
| | RP7 | | | | | | | | | | | | | | | | |
| | RP8 | | | | | | | | | | | | | | | | |
| bismuth compound (A) | | B1 | B2 | B3 | B4 | B5 | B6 | B7 | B8 | B9 | B10 | B1 | B2 | B3 | B4 | B4 | B7 |
| metal of metal compound (D) | | | | | | | | | | | | | | | | Ti | Ti |
| bismuth compound for comparison, organic tin compound for comparison | | | | | | | | | | | | | | | | | |
| content of bismuth compound % | | 2.0 | 2.0 | 2.0 | 2.0 | 2.0 | 2.0 | 2.0 | 2.0 | 2.0 | 2.0 | 2.0 | 2.0 | 2.0 | 2.0 | 1.5 | 1.5 |
| content of other metal compound % | | | | | | | | | | | | | | | | 1.5 | 1.5 |
| content of organic tin compound % | | | | | | | | | | | | | | | | | |
| curing test 170° C. | | A | A | A | A | A | A | A | A | A | A | A | A | A | A | A | A |
| 180° C. | | A | A | A | A | B | B | A | A | B | A | A | A | A | A | A | A |

| | | Example | | | | | | | Comparative Example | | | | | | | |
|---|---|---|---|---|---|---|---|---|---|---|---|---|---|---|---|---|
| | | 17 | 18 | 19 | 20 | 21 | 22 | 23 | 1 | 2 | 3 | 4 | 5 | 6 | 7 | 8 |
| emulsion solution | | 250 | 250 | 250 | 250 | 250 | 250 | 250 | 250 | 250 | 250 | 250 | 250 | 250 | 250 | 250 |
| pigment catalyst dispersion paste (stored at 35° C. for 30 days) | P1 | | | | | | | | | | | | | | | |
| | P2 | | | | | | | | | | | | | | | |
| | P3 | | | | | | | | | | | | | | | |
| | P4 | | | | | | | | | | | | | | | |
| | P5 | | | | | | | | | | | | | | | |
| | P6 | | | | | | | | | | | | | | | |
| | P7 | | | | | | | | | | | | | | | |
| | P8 | | | | | | | | | | | | | | | |
| | P9 | | | | | | | | | | | | | | | |
| | P10 | | | | | | | | | | | | | | | |
| | P11 | | | | | | | | | | | | | | | |
| | P12 | | | | | | | | | | | | | | | |
| | P13 | | | | | | | | | | | | | | | |
| | P14 | | | | | | | | | | | | | | | |
| | P15 | | | | | | | | | | | | | | | |
| | P16 | | | | | | | | | | | | | | | |
| | P17 | 5.1 | | | | | | | | | | | | | | |
| | P18 | | 5.1 | | | | | | | | | | | | | |
| | P19 | | | 6.6 | | | | | | | | | | | | |
| | P20 | | | | 6.6 | | | | | | | | | | | |
| | P21 | | | | | 6.6 | | | | | | | | | | |
| | P22 | | | | | | 6.6 | | | | | | | | | |
| | P23 | | | | | | | 6.6 | | | | | | | | |
| | RP1 | | | | | | | | 4.3 | | | | | | | |
| | RP2 | | | | | | | | | 4.3 | | | | | | |

TABLE 3-continued

Electrodeposition Coating Composition. Electrodeposition Coating Curing Test

| | | | | | | | | | | | | | | | |
|---|---|---|---|---|---|---|---|---|---|---|---|---|---|---|---|
| RP3 | | | | | | | | 4.3 | | | | | | | |
| RP4 | | | | | | | | | 4.3 | | | | | | |
| RP5 | | | | | | | | | | 4.3 | | | | | |
| RP6 | | | | | | | | | | | 4.3 | | | | |
| RP7 | | | | | | | | | | | | 4.3 | | | |
| RP8 | | | | | | | | | | | | | 4.3 | | |
| bismuth compound (A) | B4 | B7 | B7 + B9 | B4 | B7 | B7 | B7 + B8 + B9 | | | | | | | | |
| metal of metal compound (D) | Zn | Zn | Ti | Ti | Ti | Ti | Ti | | | | | | | | |
| bismuth compound for comparison, organic tin compound for comparison | | | | | | | | RB1 | RB1 | RB2 | RB2 | other Bi | other Bi | other Bi | DOTO |
| content of bismuth compound % | 1.6 | 1.6 | 1.6 | 1.5 | 1.2 | 1.5 | 1.8 | 2.0 | 2.0 | 2.0 | 2.0 | 2.0 | 2.0 | 2.0 | |
| content of other metal compound % | 0.7 | 0.7 | 1.2 | 1.5 | 1.8 | 1.5 | 1.2 | | | | | | | | |
| content of organic tin compound % | | | | | | | | | | | | | | | 2.0 |
| curing test 170° C. | A | A | A | A | A | A | A | B | B | A | A | B | B | C | A |
| 180° C. | A | A | A | A | A | A | A | C | C | C | C | C | C | C | A |

Here, in Table 3, "Content of Bismuth Compound %" represents mass % of bismuth compound (A) or comparative bismuth compound with respect to total solids of the base resin (B) and the curing agent (C) contained in the electrodeposition coating composition. In addition, "Content of Bismuth Compound %" represents weight % of the organic tin compound with respect to total solids of the base resin (B), curing agent (C), and the block isocyanate contained in the electrodeposition coating composition.

<Electrodeposition Coating, Curing Test>

A cold rolled steel (available from Nippon Testpanel Co., Ltd, standard test piece certified by Japan Association of Corrosion Control, 0.8×70×150 mm) treated with "Palbond L3080" (available from Nihon Parkerizing Co., Ltd., zinc phosphate treating agent) was weighed and immersed in the electrodeposition coating compositions obtained in Examples 1 to 23 and Comparative Examples 1 to 8. The test pieces were thus obtained, and 4 test plates for each of the test pieces were subjected to electrodeposition as an anode. The electrodeposition was carried out with the voltage of 300V, electrification time of 15 seconds, and the temperature of the coating in the electro-coating tank of 20 to 30° C. The coating obtained by electrodeposition coating was rinsed with ion exchanged water and was then air-dried for 6 hours. Subsequently, the test plates were baked in a temperature chamber (available from Espec Corp., GPHH-202). The baking was carried out with the conditions of 170° C./20 min and 160° C./20 min, and 2 test plates were used for each of the baking conditions. Each of the test plates was weighed and the weight of the electrodeposition cured coating was calculated. Subsequently, each of the test plates was immersed in acetone bath at 20° C. for 16 hours. After air drying, the test plates were dried by heating at 100° C. for 1 hour. Each of the test plates was weighed and the weight of the remaining dry coating after acetone immersion was calculated. Gel fraction was calculated in accordance with the below equation, and the curability of the coatings were evaluated in accordance with the following standards. The results are shown in Table 3.

Gel fraction (%)=100×(weight of remaining coating after acetone immersion (g))/(weight of coating before acetone immersion (g))

A: 90% or higher

B: 80% or higher and lower than 90%

C: lower than 80%

As shown in Table 3, in Examples 1 to 23 using bismuth compounds (A) (B1 to B10) prepared by using various β-diketones wherein the number of total carbon atoms in two $R^1$ in Chemical Formula (1) is 4 or larger, superior results were obtained in the curing test. On the other hand, in Comparative Examples 1 to 4 using bismuth compounds RB1 to RB2 prepared by using β-diketones wherein the number of total carbon atoms in two $R^1$ in Chemical Formula (1) is 2, the results of the curing test were inferior to Examples 1 to 23. In addition, in Comparative Examples 5 to 7 using bismuth oxide, bismuth hydroxide, and bismuth acetate oxide, the results of the curing test were inferior to Examples 1 to 23.

From the afore-mentioned results, it has been demonstrated that the bismuth compound (A) of the present invention has a superior catalytic activity and stability in aqueous medium.

The invention claimed is:

1. A catalyst for electrodeposition coating composition containing a bismuth compound (A), wherein:
   the bismuth compound is a compound having a ligand prepared from a β-diketone represented by Chemical Formula (1):

Chemical Formula (1):

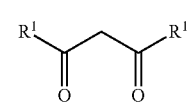

(1)

wherein, a plurality of $R^1$ are the same or different from each other and represent a hydrocarbon group, and a number of total carbon atoms in two $R^1$ is 4 or larger.

2. The catalyst for electrodeposition coating composition of claim 1, wherein the bismuth compound (A) is at least one bismuth compound having a group represented by Chemical Formula (4):

Chemical Formula (4):

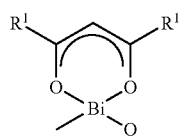
(4)

wherein, a plurality of R¹ are the same or different from each other and represent a hydrocarbon group, and a number of total carbon atoms in two R¹ is 4 or larger.

3. The catalyst for electrodeposition coating composition of claim 1, wherein the bismuth compound (A) is at least one bismuth compound represented by Chemical Formula (5):

Chemical Formula (5):

(5)

wherein, X represents —OR³, or 1,3-dicarbonylate derived from β-diketone of Chemical Formula (1); at least one of a plurality of X is 1,3-dicarbonylate; and R³ represents one of a hydrogen atom, an alkyl group, an acyl group, and —Bi—X₂, or two of R³ are substituted by Bi atom to bond two oxygen atoms.

4. The catalyst for electrodeposition coating composition of claim 1, wherein the bismuth compound (A) is at least one bismuth compound represented by Chemical Formula (2) or Chemical Formula (3):

Chemical Formula (2):

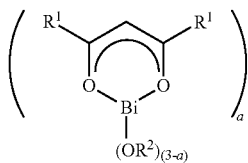
(2)

wherein, a plurality of R¹ are the same or different from each other and represent a hydrocarbon group, and a number of total carbon atoms in two R¹ is 4 or larger; R² represents one of a hydrogen atom, an alkyl group, an acyl group, and —Bi—(OR²)₂, or two of R² are substituted by Bi atom to bond two oxygen atoms; and a represents an integral number of 1, 2, or 3;

Chemical Formula (3):

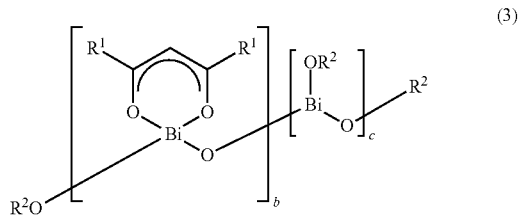
(3)

wherein, a plurality of R¹ are the same or different from each other and represent a hydrocarbon group, and a number of total carbon atoms in two R¹ is 4 or larger; R² represents one of a hydrogen atom, an alkyl group, an acyl group, and —Bi—(O—R²)₂, or two of R² are substituted by Bi atom to bond two oxygen atoms; b and c represents an integral number of 1 or more; and an order of a group provided with suffix b and a group provided with suffix c is arbitrary.

5. An electrodeposition coating composition comprising:
the catalyst for electrodeposition coating composition of claim 1; and
a base resin (B).

6. The electrodeposition coating composition of claim 5, wherein the base resin (B) contains a blocked isocyanate, or the electrodeposition coating composition contains a curing agent (C) comprising a blocked isocyanate compound.

* * * * *